United States Patent

Coudurier et al.

[11] Patent Number: 5,497,696
[45] Date of Patent: Mar. 12, 1996

[54] COOKING VESSEL WITH SUPPRESSED DEFORMATION OF THE BOTTOM

[75] Inventors: Alain Coudurier, Albens; Jean-François Brasset, Cran Gevrier; Georges Coissard, Val de Fier; Philippe Maillard, Moye, all of France

[73] Assignee: Seb S.A., Ecully, France

[21] Appl. No.: 322,617

[22] Filed: Oct. 13, 1994

[30] Foreign Application Priority Data

Oct. 13, 1993 [FR] France ................................. 93 12196
Feb. 15, 1994 [FR] France ................................. 94 01710

[51] Int. Cl.$^6$ ........................... A47J 27/00; A47J 36/02; A47J 37/10
[52] U.S. Cl. ................. 99/422; 99/447; 99/DIG. 15; 126/390; 220/912
[58] Field of Search ................. 99/450, 422, 425–427, 99/447, DIG. 14, DIG. 15, 444–446; 126/390, 373; 220/912, 454–460; 29/527.4, 527.2

[56] References Cited

U.S. PATENT DOCUMENTS

| 337,045 | 3/1886 | Carter | 126/390 X |
| 2,085,220 | 6/1937 | Howlett | 126/390 |
| 4,363,316 | 12/1982 | Aakenus et al. | 220/454 |
| 4,508,100 | 4/1985 | Deville | 126/390 |
| 4,533,807 | 8/1985 | Minamida | 126/390 |
| 4,538,590 | 9/1985 | Oh | 126/246 |
| 4,544,818 | 10/1985 | Minamida | 126/390 |
| 4,614,852 | 9/1986 | Matsushita et al. | 220/455 |
| 4,622,948 | 11/1986 | Oh | 99/422 |
| 5,357,850 | 10/1994 | Coudurier | 99/DIG. 15 |
| 5,396,834 | 3/1995 | Gambini | 99/422 |

FOREIGN PATENT DOCUMENTS

| 0175462 | 3/1986 | European Pat. Off. . | |
| 0509860 | 10/1992 | European Pat. Off. . | |
| 2415995 | 10/1979 | France | 126/390 |
| 2453627 | 12/1980 | France | 99/422 |
| 2693093 | 1/1994 | France . | |
| 552901 | 6/1932 | Germany . | |
| 410237 | 5/1934 | Germany . | |
| 237166 | 7/1945 | Switzerland . | |

*Primary Examiner*—Timothy F. Simone
*Attorney, Agent, or Firm*—Young & Thompson

[57] ABSTRACT

A cooking vessel produced from a disc (3) of light alloy or metal includes a bottom (1) intended to be placed on a cooking plate, a burner or the like. The bottom (1) includes a plate (2) made of a metal having properties different from those of the metal of the disc (3). This plate (2) is completely or partially embedded in the bottom (1) and its periphery is preferably adjacent to a groove (4). The bottom of such a cooking vessel exhibits improved resistance to deformation.

14 Claims, 2 Drawing Sheets

COOKING VESSEL WITH SUPPRESSED DEFORMATION OF THE BOTTOM

FIELD OF THE INVENTION

The present invention relates to a cooking vessel, the deformation of the bottom of which, under the effect of heat and of abrupt temperature variations which it experiences during use, is suppressed.

BACKGROUND OF THE INVENTION

Cooking vessels are generally produced from a deep-drawn aluminum sheet.

During heating, the surface of the bottom of the vessel, in contact with a cooking plate or a burner, is exposed to a temperature markedly higher than the inside surface of the said bottom.

As a result, thermal expansion gives rise to a convexity of the bottom of the vessel.

In order to prevent this detrimental phenomenon, the bottom of the vessel is given a slight concavity so that, during heating, this bottom becomes substantially planar under the effect of the expansion. On cooling, the bottom theoretically resumes its concavity.

However, experience shows that, after a certain number of repeated cycles of heating and cooling, the concavity of the bottom of the vessel decreases, then becomes zero and eventually the bottom becomes convex, the vessel thus becoming virtually unusable.

This result is explained by the properties of aluminum.

During repeated cycles of heating and cooling, the elastic region is exceeded, resulting in irreversible deformation.

SUMMARY OF THE INVENTION

The purpose of the present invention is to prevent the irreversible deformation of the bottom of cooking vessels produced from a sheet of light alloy or metal such as aluminum.

The invention thus aims to provide a cooking vessel produced from a deep-drawnsheet of light alloy or metal, which includes a bottom intended to be placed on a cooking plate, a burner or the like, this bottom being slightly concave.

According to the invention, this cooking vessel is characterized in that the said bottom includes a plate possibly composed of several elements, this plate being centered and covering only a small portion of this bottom, made of a metal or alloy having mechanical, thermal and physical characteristics different from those of the metal or alloy of the said sheet, this plate being embedded in the said bottom. This embedding may be partial or complete.

By virtue of this plate embedded in the localized zone of the bottom of the vessel and having mechanical, thermal and physical properties different from those of the metal or alloy forming the rest of the vessel, any irreversible deformation of the bottom of the vessel, even after a very large number of repeated cycles of heating and cooling, is prevented.

Tests have shown that it was important that the above plate should be embedded only over a small portion of the surface of the bottom.

Preferably, the concavity of the said bottom is such that, when it is placed on a cooking plate, that bearing surface of the bottom located around the plate having different mechanical, thermal and physical properties touches the cooking plate, whereas the aforementioned plate does not touch the cooking plate.

The concavity is produced during the deep-drawing of the light alloy or metal disc into which the said plate has been completely or partially embedded beforehand.

The metal or alloy of the vessel will generally be based on aluminum and the plate partially or completely embedded in the bottom will generally be made of steel and preferably made of stainless steel.

Preferably, the said plate covers between 5 and 30% of the surface of the bottom.

A groove is possibly made at the periphery of the plate.

Preferably, the plate has holes and is partially or completely embedded in the bottom in such a way that the metal of the said bottom completely fills the said holes. The embedding thus produced leaves the plate with a slight overthickness with respect to the surface of the bottom.

The embedding of this plate in the metal of the bottom of the vessel may be produced by cold striking, as described in the European Patent Application 0,509,860 in the name of the Applicant Company, or by welding, braising or bonding.

In a preferred version of the invention, the plate has a thickness lying between $3/10$th and $5/10$th of one mm and is embedded in the bottom to a depth lying between $0.5/10$th and $1.5/10$th of one ram, for an aluminum bottom having a thickness lying between 2.5 and 5 mm.

BRIEF DESCRIPTION OF THE DRAWINGS

Other features and advantages of the invention will also appear in the description below.

In the appended drawings, given by way of nonlimiting examples.

DETAILED DESCRIPTION OF THE INVENTION

Figure 1:
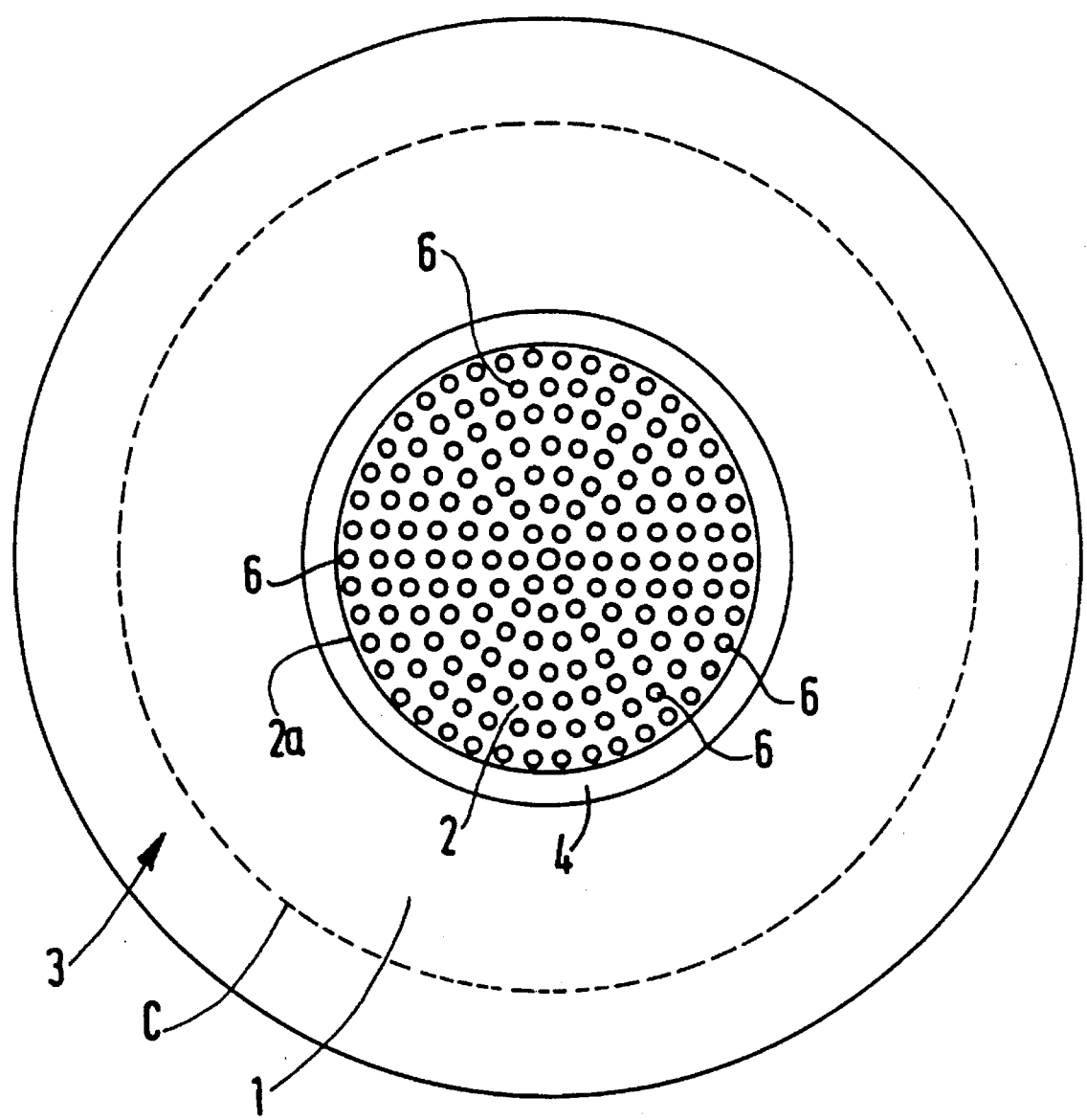
FIG. 1 is a plan view of a disc intended to be deep-drawn into the shape of a vessel according to the invention.
Figure 2:
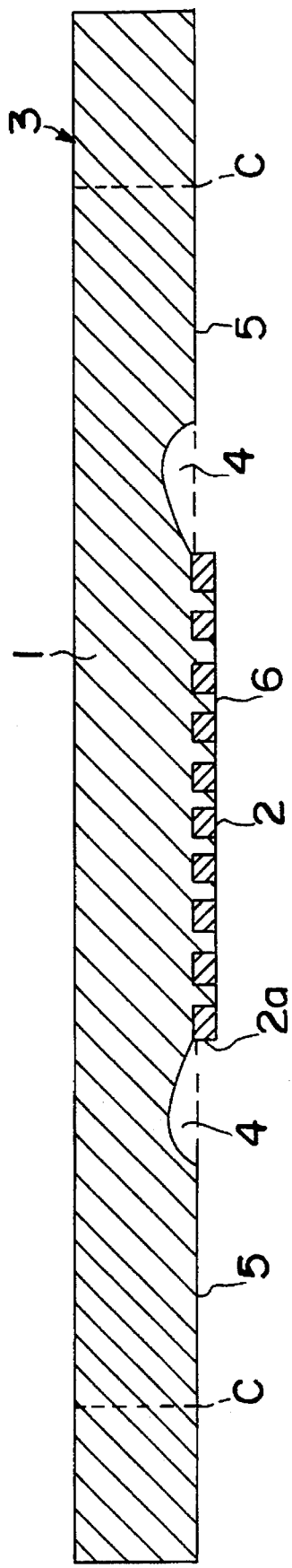
FIG. 2 is a sectional view of the aforementioned disc.
Figure 3:
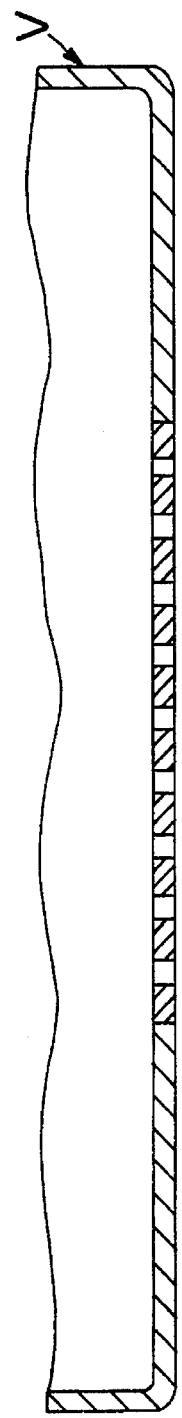
FIG. 3 is a partial sectional view of a cooking vessel after deep-drawing the disc of FIG. 2.

FIGS. 1 and 2 show a disc cut out from a sheet made of light alloy or metal, such as aluminum. This disc is intended to be deep-drawn, in a manner well-known to the person skilled in the art, into the shape of a cooking vessel (FIG. 3), such as a frying pan or a saucepan, which includes a bottom intended to be placed on a cooking plate or a burner.

In FIG. 1, the periphery of the bottom 1 of the vessel has been delimited by a dotted circle C.

Also well known in the art, this bottom 1 is produced in a slightly concave manner during the deep-drawing of the disc 3.

In accordance with the invention, the bottom 1 includes, in its central part, a plate 2 made of a metal or alloy having different properties from the metal or alloy of the disc 3.

As may be seen in FIG. 2, the plate 2 is embedded in the metal of the bottom 1 and the periphery 2a of this plate 2 is adjacent to a groove 4 made in the said bottom 1.

After deep-drawing the disc 3, the concavity of the bottom 1 is such that, when it is placed on a cooking plate, that surface 5 of the bottom located around the plate 2 touches the cooking plate, whereas that of the plate 2 does not touch the latter.

Preferably, the disc 3 is made of aluminum having a thickness lying between 2.5 and 5 mm.

The plate 2 is preferably made of stainless steel.

This plate 2 preferably covers between 5 and 30% of the surface of the bottom 1. In fact, this small proportion of the covering of the bottom 1 by the plate 2 ensures the best results, both as regards the resistance of the bottom 1 to deformation under the effect of repeated cycles of heating and cooling, and as regards the heat transfer and the temperature distribution.

These results are understandable especially by the partial embedding of the plate 2 in the central zone of the bottom of the vessel and by the different properties of the steel compared to those of the aluminum, preventing the deformation of the bottom from becoming irreversible under the effect of repeated cycles of heating and cooling.

In the embodiment of FIGS. 1 and 2, the plate 2 has holes 6, for example circular holes, uniformly spaced and distributed over the entire surface of the plate. This plate 2 is partially embedded in the bottom 1. This plate 2 may be embedded in the bottom 1 by cold striking, as described in the European Patent Application 0,509,860 in the name of the Applicant Company.

In this way, the plate 2 is solidly bound to the bottom 1 of the vessel at a large number of points and reduces any deformation of this bottom 1 by virtue of the steel used for this plate.

It is sufficient for the plate 2 to have a thickness lying between 3/10th and 5/10th of one mm (for an aluminum bottom having a thickness lying between 2.5 and 5 mm). Its embedding in the bottom 1 to a depth lying between 0.5/10th and 1.5/10th of one mm is sufficient to obtain excellent results. Moreover, too great an embedding of the plate 2 in the metal of the bottom 1 turns out to be detrimental.

As shown in FIG. 1, the plate 2 has the shape of a disc. However, the plate 2 could have a polygonal shape or that of a ring. The plate 2 could possibly be divided into several sectors or be produced in the shape of a grid.

The size of the holes 6 of the plate 2 is not critical. However, it is preferable that the holes 6 of the plate 2 have a diameter less than twice the gap between two holes.

By way of example, the holes 6 may have a diameter of approximately 3 mm and the gap between two holes may be approximately 2 mm.

Given hereinbelow are the results of comparative tests between two frying pans, one being conventional and the other produced in accordance with the invention.

The two frying pans were of identical size and were produced from an aluminum disc of thickness equal to 3.4 mm.

The frying pan in accordance with the invention had, on its bottom, a stainless steel disc of thickness equal to 0.5 mm and of diameter equal to 75 mm.

These two frying pans were subjected to repeated cycles of abrupt heating and cooling (heating to 250° C. and then cooling in tap water to approximately 20° C.).

Irreversible deformation of the bottom of the conventional frying pan was found after 30 of the above cycles.

In the case of the frying pan according to the invention, irreversible deformation of the bottom was found only after 300 repeated cycles of heating and cooling.

Of course, the invention is not limited to the examples which have just been described, and numerous modifications may he made to them without departing from the scope of the invention.

Thus, the plate 2 may have any shape and it may be not centered on the bottom of the vessel.

This plate may, for example, he in the form of a star with any number of branches. The shape of the plate may he unsysunetrical and may, for example, have one branch extending in one direction, for example the direction of the handle of the vessel.

We claim:

1. Cooking vessel produced from a deep-drawn sheet of light alloy or metal, comprising a slightly concave bottom including a plate covering only a small portion of said bottom, said plate being made of a metal or alloy and having mechanical, thermal and physical properties different from those of the metal or alloy of said sheet, said plate being at least partially embedded in said bottom.

2. Cooking vessel according to claim 1, wherein said vessel is produced from an aluminum sheet, and said plate is made of steel.

3. Cooking vessel according to claim 1, wherein the concavity of said bottom is such that, when said bottom is placed on a cooking plate, a bearing surface of the bottom located around the plate having different properties touches the cooking plate, whereas said plate does not touch the cooking plate.

4. Cooking vessel according to claim 1, wherein said plate covers between 5 and 30% of the surface of the bottom.

5. Cooking vessel according to claim 1, wherein the plate includes a plurality of holes.

6. Cooking vessel according to claim 5, wherein the holes of the plate are of a size less than twice the gap between two holes.

7. Cooking vessel according to claim 6, wherein the holes have a diameter of approximately 3 mm and the gap between two holes is approximately 2 mm.

8. Cooking vessel according to claim 1, wherein the plate has a thickness lying between 3/10th and 5/10th of one mm, and is embedded in the bottom of a depth lying between 0.5/10th and 1.5/10th of one mm, for an aluminum bottom having a thickness lying between 2.5 and 5 mm.

9. Cooking vessel according to claim 1, wherein the plate is surrounded by a groove made in the bottom.

10. Cooking vessel according to claim 1, wherein the plate has the shape of a disc.

11. Cooking vessel according to claim 1, wherein the plate is divided into several sectors.

12. Cooking vessel according to claim 1, wherein the plate is centered on the bottom of the vessel.

13. Cooking vessel according to claim 1, wherein the plate is not centered on the bottom of the vessel.

14. Cooking vessel according to claim 1, wherein the plate is completely embedded in said bottom.

* * * * *